Patented Oct. 4, 1949

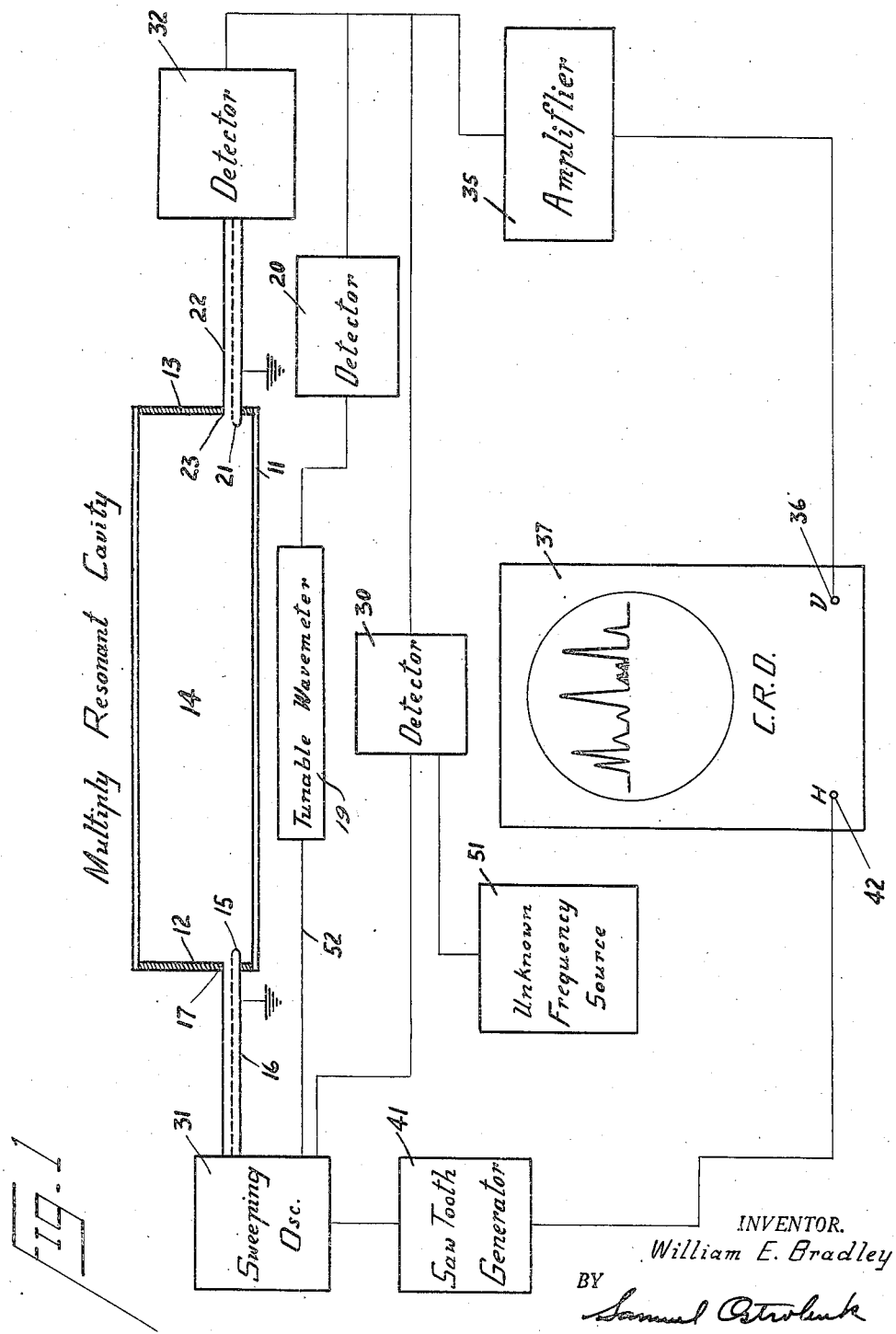

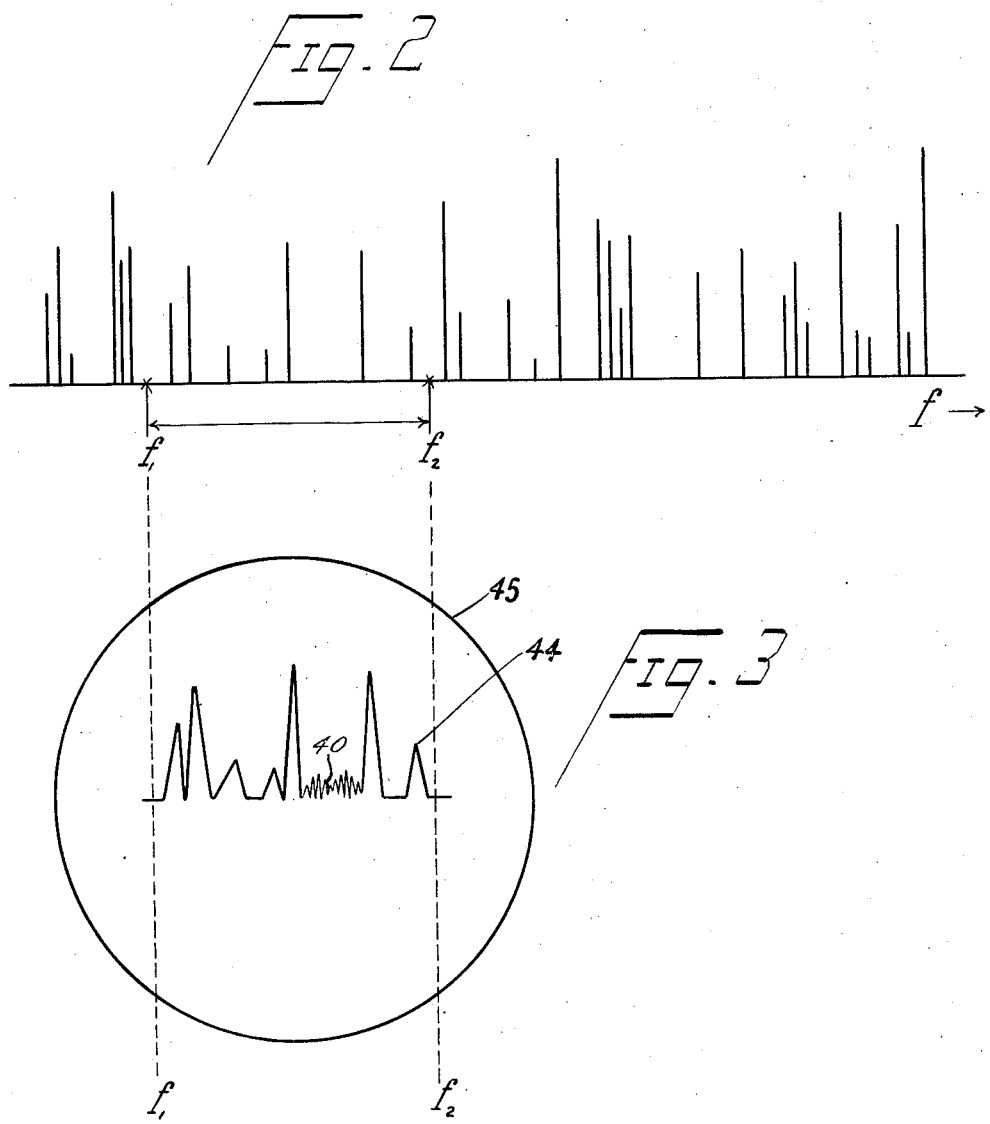

2,483,802

UNITED STATES PATENT OFFICE 2,483,802

ULTRA HIGH FREQUENCY MEASURING DEVICE

William E. Bradley, Swarthmore, Pa., assignor, by mesne assignments, to Philco Corporation, Philadelphia, Pa., a corporation of Pennsylvania Application June 20, 1944, Serial No. 541,204

17 Claims. (Cl. 250—39)

My invention relates in general to the field of frequency measurement and more specifically concerns a novel wave meter.

In ultra-high frequency signal generation and transmission, the measurement of wave length or frequency has been long recognized as a difficult problem. The nature of the frequency measuring problems are ordinarily associated with the range of the unknown frequency. At ordinary radio frequencies, the conventional absorption type tuned circuit frequency meter is sufficient for an accurate determination of the signal frequency. For higher frequencies, the tuned circuit generally comprises a circuit having distributed constants; as for example, a parallel wire transmission line or a coaxial line.

Frequency measurement by means of tuned lines presents certain difficulties which severely limit the accuracy and speed with which these measurements may be taken. For example, these methods generally depend upon a movable element as a line short-circuiting device. These mechanical systems require considerable maintenance and are subject to errors due to shift in the calibration of the movable mechanical members and high resistance contacts.

For frequencies of the order of several thousand megacycles, it has been customary to utilize tuned wave guides as wave meters. These wave guides were arranged so that the unknown frequency to be measured was coupled in at one end, and the output signal at the other end fed to a suitable detector and indicator. One end of the wave guide was closed by a movable piston which was adjusted for maximum signal output as indicated at the detector. The resulting length of the wave guide was thus an indication of the frequency of the input signal.

Summarizing, therefore, previous high frequency wave meters have in general been electromechanical devices arranged so that movable mechanical means would ultimately indicate the signal frequency. These frequency meters required constant recalibration since wear of the mechanical members resulted in unreliable readings of frequencies or wave lengths.

My invention contemplates an ultra-high frequency wave meter of extreme accuracy and of inherently permanent calibration. This novel type of wave meter requires no mechanical movement whatsoever for tuning or adjustment, and is essentially direct reading in frequency over a considerably wide band as determined by the particular application thereof.

The basic element in my novel type of wave meter is a resonant cavity having a plurality of resonances unevenly distributed throughout the desired frequency band. This resonant cavity is of durable construction and is completely sealed and unadjustable. The size and shape of this cavity will of course be determined by application.

As is well understood in the art, a hollow, enclosed resonant cavity will have a frequency transmission characteristic which is purely a function of its geometry. In accordance with by invention, an input high frequency coupling unit is connected at one end of the sealed resonant cavity, and an output coupling unit at the other end thereof.

In order to establish the invariable frequency calibration for the wave meter of my invention, the transmission characteristics of the resonant cavity are ascertained by means of a primary frequency standard. This known frequency source is connected to the input coupling unit and a suitable detector of transmitted energy is connected to the output coupling unit of the cavity. A known amplitude input signal is introduced to the input coupler and the output amplitude at that particular frequency is measured by means of the detector. The primary frequency standard is set in this manner for different frequencies over the entire desired band, and for each setting the output amplitude is measured.

A calibration curve consisting of a representation of the relative transmission response for all frequencies in the desired range may thus be established and shown graphically for convenience. Since the resonant cavity which forms the basis of this type of wave meter is of a simple fixed geometrical design, the transmission characteristic as determined by the variable primary frequency source may be checked with high precision by mathematical calculation. It is important to note that since the resonant cavity is a fixed metallic unit without provision for mechanical adjustment, the transmission characteristic previously obtained is permanent and is the only calibration to which this type of wave meter need ever be subject. Having established the characteristic of wave transmission as a function of input frequency, the resonant cavity is placed into the novel wave meter circuit to be described.

In the wave meter circuit, the input coupling unit of the resonant cavity is continuously energized by a sweeping oscillator. This oscillator generates a signal of continuously varying frequency covering a portion of the range of frequencies in which the wave meter is to be utilized. A detector unit is connected to the output coupling unit of the resonant cavity, and is in turn coupled through an amplifier to the vertical deflection plates of a cathode ray oscilloscope.

The frequency of the sweeping oscillator is determined by a variable amplitude signal, preferably a saw-toothed wave, which is also applied to the horizontal deflection plates of the cathode ray oscilloscope. It is therefore obvious that operation of the sweeping oscillator will generate a continuous spectrum of frequencies, the transmission characteristic of which through the cavity resonator is determined by the output detector. Since the horizontal and vertical deflection plates of the cathode ray oscilloscope are essentially co-ordinated by the variable amplitude saw-tooth wave, the beam of the cathode ray oscilloscope will trace out a transmission characteristic curve of the cavity resonator which is similar in all respects to that obtained mathematically or mechanically in the primary calibration of the resonant cavity for the particular frequency range. Thus, for the range of frequency covered by the sweeping oscillator, it is possible to compare the trace of the cathode ray oscilloscope and the established calibration curve of the resonant cavity, and thus identify the frequency of the resonances as indicated on the fluorescent screen. Such a comparison is simple as the frequency response curve is irregular and no one portion thereof resembles another.

In the actual measurement of an unknown frequency, this signal is connected to a detector with some of the signal generated in the sweeping oscillator. The latter detector will in this manner become responsive to the beat signal between the unknown frequency to be measured and that component of the sweeping frequency output which is equal in frequency to the unknown frequency. Accordingly, the unknown frequency will generate within this detector circuit a beat signal which when impressed upon the cathode ray oscilloscope will appear superimposed upon the continuous trace representing the transmission characteristic of the cavity resonator.

By inspection, the position of the response of the unknown frequency in the frequency band may be ascertained by merely interpolating between the frequency response points on the cathode ray oscilloscope. For the final accurate determination of the unknown frequency, this interpolation is performed by inspection of the primary calibration of the resonant cavity. It is thus evident that to measure any unknown ultra-high frequency or band of frequencies, these signals need only be applied to the detector circuit for the unknown and will instantaneously appear in their proper relative position in the frequency spectrum shown upon the cathode ray tube. No adjustment need be made since the primary calibration is invariable, and the unknown frequencies may be readily read therefrom.

As the primary calibration of the cavity may extend over a large band of frequencies, it may often be desirable to know approximately the location of the resonances on the cathode ray screen. To this end, a tunable calibrated wavemeter may be connected from the sweeping oscillator through another detector to the oscilloscope amplifier. In this manner, a movable resonance peak may be obtained upon the screen and the range thereof read directly from the wavemeter, thereby locating the resonance peaks' range. The movable peak may be used for interpolation.

It is therefore an object of my invention to provide a novel and improved form of ultra-high frequency wave meter.

A further object of my invention is to provide a wave meter which requires no tuning adjustment or movable mechanical members whatsoever.

Another object of my invention is to provide an ultra-high frequency wave meter having an invariable frequency characteristic.

A still further object of my invention is to provide a circuit for directly indicating upon a cathode ray tube the frequency response characteristic of a wave meter.

These and other objects of my invention will now become apparent from the following complete specification taken in connection with the accompanying drawings in which:

Figure 1 is a schematic diagram of my novel wave meter circuit.

Figure 2 is a diagram of a frequency response characteristic of a resonant cavity; and Figure 3 is a representation of a cathode ray tube in operation in accordance with my invention.

Referring now to Figure 1, there is shown schematically the circuit diagram of my novel wave meter. A wave guide or cavity 11 comprises the basic standard of the novel wave meter. This wave guide is cut to be as much as 20 wave lengths long in the frequency range covered by this wave meter.

The cross section of the wave guide 11 may assume any of the conventional forms such as rectangular or circular. Mechanically the wave guide 11 is reinforced and made of sufficiently heavy stock so as to preclude deformation thereof. For this purpose, the circular wave guide is preferable. The ends 12 and 13 of the wave guide 11 are suitably sealed by metallic plates as illustrated, thus forming a resonant chamber 14 within the metal enclosure 11. The chamber 14 is of fixed geometrical dimensions and, accordingly, has an established invariable electrical characteristic.

As illustrated in Figure 1, an input coupling unit comprising essentially a small loop 15 terminating a section of co-axial cable 16 is sealed into a perforation 17 in the metallic end plate 12. The shield of the co-axial cable 15 is grounded as shown. In a similar manner, an output coupling unit comprising a loop 21 at the end of a length of co-axial cable 22 is sealed into a perforation 23 in the output end plate 13. The coupling loops 15 and 21 are the sole electrical connections to the fixed chamber 14. The coupling units 15 and 21 are mechanically secured so that the electrical coupling characteristics thereof will not vary with time.

As is well understood in the art of ultra-high frequency signalling, the cavity 14 extending between the input coupling unit 15 and the output coupling unit 21 has an electrical transmission or attenuation characteristic which is a function of frequency. If the diameter of the wave guide 11 is sufficiently large compared with the frequency range in which coverage is desirable, then the transmission characteristic between the input and output coupling unit 15 and 21 respectively will contain a plurality of resonances of different order of magnitude.

As the geometrical configuration of the chamber 14 is comparatively simple, the mathematical determinations of the transmission frequency characteristics thereof may be carried through without difficulty. This mathematical determination of the transmission spectrum of the cavity 14 may of course be checked by means of a primary frequency standard; for example, a standard frequency source may be connected to the coaxial cable 16 at the input end of the resonant cavity.

A detector consisting of a rectifier output meter may be connected to the coaxial cable 22. The input frequency source is arranged to generate a signal of constant amplitude. For each frequency of signal input, the output meter reads a relative value indicating the ability of that particular frequency signal to travel through the cavity 14 without attenuation. Many frequencies may, of course, be covered by this primary standard and output meter.

A characteristic curve of relative transmission, as a function of frequency for a resonator of the type illustrated in Figure 1 is shown in Figure 2. This curve indicates the plurality of frequencies at which cavity resonator 14 is resonant through the frequency range desired for this wave meter. Since the different modes are attenuated differently, the resonance peaks shown in Figure 2 are of variable amplitude. Nowhere is the frequency pattern repetitive. In general, for most cavities, the resonance peaks are sufficiently close together so as to cover completely the desired frequency range. The characteristic of relative transmission as a function of frequency as illustrated in Figure 2, is thus established by calculations and by checks with a primary standard of frequency, and once established, comprises the basic calibration for my novel wave meter. Thus, the relative response chart may be drawn up in the manner shown in Figure 2, and attached to the wave guide in the form of a long strip indicating by the series of peaks the transmission characteristic of the wave guide. As will be described later, this calibration chart is used to directly determine the frequency of an unknown source.

Returning now to Figure 1, the calibrated wave guide 11 is connected into a circuit comprising a sweeping oscillator 31 connected to the input coupling unit 15 and a detector 32 connected to the output coupling unit 21 of the cavity 14. The sweeping oscillator 31 consists essentially of an ultra-high frequency signal generator tunable in the range of an unknown signal being measured.

The frequency of the ultra-high frequency source 31 in any range is controlled by a saw-tooth generator 41 such that the output frequency is a linear function of the applied amplitude. Thus, for example, if it is desirable to measure a frequency in the range of 15,200 megacycles per second, the sweeping oscillator 31 may be arranged to generate signals varying between 15,100 and 15,300 megacycles in accordance with the impressed saw-tooth amplitude. The rate of variation may be high, and the oscillator sweeps through all frequencies between 15,100 megacycles and 15,300 megacycles many times per second.

The cavity resonator 14 is thereby continuously fed by a variable frequency constant amplitude signal from the input coupling unit 15. These signals travel down the cavity 14 to the output coupling unit and are in turn impressed upon amplitude modulation detector 32. As is evident from Figure 2, the transmission loss is generally high except for those modes of oscillation indicated by the plurality of resonance peaks. Thus, as the frequency of the signal applied to the coupling unit 15 varies continuously, the signal received by the coupling unit 21 and applied to the detector 32 consists of a series of sharp peaks occurring at those frequencies which are transmitted. The detector 32 may comprise a rectifier and accordingly the signal output of detector 32 consists of a series of rapidly varying peaks occurring as many times per second as the sweeping oscillator 31 covers the frequency band.

The low frequency detected output of detector 32 is applied to a low frequency amplifier 35 of conventional circuit design, and the output thereof is in turn coupled to the vertical deflection plates 36 of a cathode ray oscilloscope 37.

The output of the saw-tooth generator circuit 41 which is a linear function of the frequency output of the oscillator 31, is applied to the horizontal plates 42 of the cathode ray oscilloscope 37. The signals at the horizontal and vertical deflection plates of the oscilloscope 37 are related in time in that the instantaneous amplitude applied to the horizontal deflection plates 42 is proportional to that frequency which is detected at 32, and passed on to amplifier 35 and to the vertical deflection plates 36. Thus, as is illustrated diagrammatically in Figure 3, the face of the cathode ray tube in the oscillocope 37 will present a curve which is the frequency transmission characteristic of the multiple resonant cavity 14 in the range of the sweeping oscillator and is identical to a section of that characteristic originally established for the wave guide 14 and illustrated in Figure 2. For example, if the sweeping oscillator 31 is adjusted to vary continuously in output frequency between the ranges $F_1$ and $F_2$ of the frequency spectrum illustrated in Figure 2, the image upon the cathode ray oscilloscope 45 will be a corresponding series of peaks in the range $F_1$, $F_2$. Since all of the resonance peaks of the characteristics illustrated in Figure 2 are of known frequencies as established by the primary calibration of the resonant chamber 14, the curve 44 traced out on the oscilloscope may be utilized through the agency of the various peaks appearing thereupon as a visual representation of a frequency band. If the band of sweep of the oscillator 31 is changed, then the trace 44 on the cathode ray screen will change to correspond with the new different band as determined from the response characteristic of Figure 2.

In order to measure the frequency of an unknown source such as 51 in Figure 1, the unknown frequency is applied to the input circuit of another amplitude modulation detector 30 along with the signal generated in sweeping oscillator 31. Thus, wire 52 is used to couple a portion of the output of sweeping oscillator 31 to the input of detector 30.

Ordinarily, the application of the variable frequency output signal of oscillator 31 to amplitude modulation detector 30 would have no effect in the output of the detector circuit since the signal generated in oscillator 31 is of constant amplitude. However, since the signal of unknown frequency is also applied to the detector 30, a beat effect is present whenever the sweeping oscillator frequency passes through the vicinity of the frequency of the unknown source 51. Thus, at some point during each cycle of the frequency variation of oscillator 31 a low frequency beat signal, within the range of beat frequencies that the amplifier 35 and the oscilloscope amplifier will pass, will appear in the output of the detector 30 and will in this manner be passed on, with the low frequency signals present in the output of detector 32, to the amplifier 35 and to the vertical deflection plates 36 of the cathode ray oscilloscope. Accordingly, since the beat signal is synchronized in time with the cathode ray horizontal sweep generated in circuit 41, the beat will appear upon the cathode ray screen at its proper point in the frequency spectrum, as is illustrated at 40 in Figure 3. It will be apparent that the beat frequency signal corresponding to the sum of the frequencies of the signals supplied by sources 31 and 41 may be disregarded since the low frequency amplifier 35 is incapable of passing such ultra-high beat frequencies.

It is desirable to arrange a filter network between detector 30 and amplifier 35 to eliminate the very low frequency components of the low frequency beat wave and thus produce a sharp node at the center of the beat shown at 40 in Figure 3.

This impulse is easily recognized as the one produced by the beat signal since it does not ordinarily appear upon the frequency spectrum illustrated in Figure 2. Evidently, therefore, by a comparison of the cathode ray trace such as that shown in Figure 3, and the standardizing calibration shown in Figure 2, the beat signal may be immediately placed at its proper location in the frequency spectrum, and by a simple interpolation the unknown frequency may be readily determined to a high degree of accuracy. Should the unknown frequency occur exactly at one of the resonances illustrated in the response curve of Figure 2, then a marked change in amplitude of this resonance will immediately be evident.

In the foregoing, reference has been made to "low frequencies" and to "very low frequencies." It will be apparent that these terms are relative and distinguish from the "ultra-high frequencies" which the device of the present invention is adapted to measure. The precise value of the "low frequencies" and the "very low frequencies" will, of course, be a function of the horizontal sweep frequency as determined by sawtooth generator 41, since this frequency determines the rate at which the spectrum is swept, and hence also the rate at which pulses of ultra-high frequency energy are supplied to the detector 32. In practice the "low frequencies" referred to may, for example, be of the order of 0 to 250,000 cycles, while the "very low frequencies" may be those frequencies lying below 20,000 cycles.

As the primary calibration of the wave guide 14 may be of considerable extent, it is desirable to provide means for indicating the range of operation. As illustrated in Figure 1, a tunable wavemeter 19, operative in the desired range, is coupled from the sweeping oscillator 31 to a detector 20, which in turn is coupled to the amplifier 35. The wavemeter 19 will pass only that frequency indicated by its dial, and accordingly a single resonance peak at this frequency will appear upon the screen, properly located upon the frequency spectrum. This resonance peak is easily found upon the screen, since by movement of the wavemeter control the peak may be moved across the screen. The upper and lower frequencies appearing on the screen may be found approximately in this manner, and compared with the calibration chart for a final exact determination. In addition to locating the frequency band, the wavemeter 19 may be used as an interpolator between the frequencies on either side of a beat frequency caused by the unknown.

The unknown frequency source 51 is in no manner limited to a single frequency signal. A plurality of unknown signals may be readily applied to the input of detector 30 and as a result, a frequency spectrum of the unknown source will be superimposed upon that of the standard resonant cavity 14. Each of the unknown frequencies may then be determined by interpolation.

From the above description of the operation of my novel wavemeter, it is immediately evident that subsequent to the primary calibration of the wave guide 14, no further calibration need be necessary since the wave guide in itself is invariable, and since the electrical circuits utilized in conjunction therewith need not be standardized or calibrated.

A large band of frequencies may of course be covered by a single wave guide such as 14, by suitably proportioning the guide and then determining the calibration curve of Figure 2, over the desired large band. For entirely different ranges of frequencies, of course, it is evident that different wave guides and different range sweeping oscillators may be inserted into the circuit.

The system described and illustrated for measuring frequency has many applications in ultra-high frequency engineering. It may be used as a visual means for tuning up various circuits, oscillators and the like. This wave meter may in turn be utilized to calibrate the well known types of mechanical tunable wavemeters. For this type of calibration, a portion of the output of the sweeping oscillator 31 may be transmitted through the tunable wavemeter to be calibrated. The output of this wavemeter may be applied to a separate detector, the output of which is in turn applied with the output of detector 32 to the oscilloscope 37.

The response peak of the tunable wavemeter may be moved back and forth across the frequency spectrum on the oscilloscope by turning its tuning control and thus changing its resonance point. In this manner the resonant peak of the tunable wavemeter may be brought to coincide exactly with one of the resonant modes of the cavity resonator 14, and the frequency at this point may be accurately inscribed upon the wavemeter tuning control. An accurate calibration may be obtained by these means since no interpolation is necessary if coincidence of resonant peaks is utilized. Thus, in accordance with my invention, the frequency of ultra-high frequency signals may be accurately determined by direct means. The apparatus is permanent and the calibration is invariable.

From a study of this basic concept of frequency measurement, it is evident that many modifications may be evident to those skilled in the art, and I therefore prefer that the spirit and scope of my invention be defined not by the above specific disclosures, but only by the appended claims.

I claim:

1. In a wave meter system for measuring the frequency of a signal, a cavity resonator of fixed geometric construction; means for impressing a range of frequencies on said cavity resonator; an oscilloscope; means for indicating on said oscilloscope the transmission characteristics of said cavity resonator for the frequencies impressed on said cavity resonator said means being controlled by said signal frequency being measured for producing a change in the indication on said oscilloscope as the range of frequencies passes through said unknown frequency.

2. In a wave meter system for measuring the frequency of a signal, a signal transmitting medium having predetermined transmission characteristics for a range of frequencies of electric wave energy; means for impressing said range of frequencies on said signal transmitting medium; an oscilloscope; means for indicating on said oscilloscope the transmission characteristics of said signal transmitting medium for the frequencies impressed on said signal transmitting medium, and means controlled by said signal frequency being measured for producing a change in the indication on said oscilloscope as the range of frequencies passes through said unknown frequency.

3. In a wave meter system for measuring the frequency of a signal, a cavity resonator of fixed geometric construction; means for impressing said range of frequencies on said cavity resonator; a cathode ray tube oscilloscope; means for indicating by varying amplitudes along one axis of said cathode ray tube oscilloscope the transmission characteristics of said cavity resonator for the frequencies impressed on said cavity resonator, said means being controlled by said signal frequency being measured for producing a change in the amplitude indication on said cathode ray tube oscilloscope as the range of frequencies passes through said unknown frequency.

4. In a wave meter system for measuring the frequency of a signal, a cavity resonator of fixed geometric construction; means for impressing said range of frequencies on said cavity resonator; an oscilloscope; means for indicating on said oscilloscope the transmission characteristics of said cavity resonator for the frequencies impressed on said cavity resonator, said means being controlled by said signal frequency being measured for producing a change in the indication on said oscilloscope as the range of frequencies passes through said unknown frequency; said means producing co-ordinated horizontal and vertical deflections in said oscilloscope tracing the transmission characteristics of said cavity resonator and being controlled by the frequency of said signals for changing the trace on said oscilloscope as said range of frequencies passes through the unknown frequency.

5. In a wave meter system for measuring the frequency of a signal, a cavity resonator of fixed geometric construction giving it predetermined transmission characteristics for a range of frequencies of electric wave energy; means for impressing said range of frequencies on said cavity resonator; means for providing individual visual indication of the transmission characteristics of said cavity resonator for the frequencies impressed on said cavity resonator, said means being controlled by the frequency of said signals for changing the indication as said range passes through the unknown frequency.

6. In a wave meter system for measuring the frequency of a signal, a cavity resonator of fixed geometric construction giving it predetermined transmission characteristics for a range of frequencies of electric wave energy, said transmission characteristic being calibrated to provide a visual indication of said characteristics; means for impressing said range of frequencies on said cavity resonator; an oscilloscope; means for impressing the output of said cavity resonator on said oscilloscope; the co-ordinated horizontal and vertical deflections in said oscilloscope tracing the transmission characteristics of said cavity resonator similar to the primary calibration of said cavity resonator for said predetermined range of frequencies, said deflections being controlled by the frequency of said signals for changing the trace on said oscilloscope as said range of frequencies passes through the unknown frequency.

7. In a wave meter system for measuring the frequency of a signal, a cavity resonator of fixed geometric construction giving it predetermined transmission characteristics for a range of frequencies of electric wave energy, said cavity resonator being calibrated to provide a visual indicator of said characteristics; means including a sweeping oscillator for impressing said range of frequencies on said cavity resonator; an oscilloscope; means including said sweeping oscillator for deflecting the cathode ray beam of said oscilloscope along one of its components; means for deflecting the cathode ray beam of said oscilloscope along its other component in accordance with the transmission characteristics of said cavity resonator; the co-ordinated horizontal and vertical deflections in said oscillopscope tracing the transmission characteristics of said cavity resonator, said vertical deflection means being controlled by the frequency of said signals for changing the trace on said oscilloscope as said range of frequencies passes through the unknown frequency.

8. In a wave meter system for measuring the frequency of a signal, a cavity resonator of fixed geometric construction giving it predetermined transmission characteristics for a range of frequencies of electric wave energy; means including a sweeping oscillator for impressing said range of frequencies on said cavity resonator, a cathode ray tube oscilloscope having pairs of deflecting means; means for impressing signals, varying in amplitude in accordance with the output signals of said cavity resonator on one pair of deflecting means of said oscilloscope, and means for impressing signals varying in amplitude with the variation in frequency of said oscillator on the other pair of deflecting means of said oscilloscope.

9. In a wave meter system for measuring the frequency of a signal, a cavity resonator of fixed geometric construction giving it predetermined transmission characteristics for a range of frequencies of electric wave energy; the transmission characteristics of said cavity resonator being visually calibrated; means including a sweeping oscillator for impressing said range of frequencies on said cavity resonator, a cathode ray tube oscilloscope having pairs of deflecting means; means for impressing signals, varying in amplitude in accordance with the output signals of said cavity resonator, on one set of deflecting mean of said oscilloscope, and means for impressing signals varying in amplitude with the variation in frequency of said oscillator on the other pair of deflecting means of said oscilloscope, the co-ordinated horizontal and vertical deflections in said cathode ray tube tracing a transmission characteristic of said cavity resonator similar to the calibration of said cavity resonator for said range of frequencies.

10. In a wave meter system for measuring the frequency of a signal, a cavity resonator of fixed geometric construction giving it predetermined transmission characteristics for a range of frequencies of electric wave energy; the transmission characteristics of said cavity resonator being visually calibrated; means including a sweeping oscillator for impressing said range of frequencies on said cavity resonator, a cathode ray tube oscilocope having pairs of deflecting means, means for impressing signals, varying in amplitude in accordance with the output signals of said cavity resonator, on one set of deflecting means of said oscilloscope, and means for impressing signals varying in amplitude with the variation in frequency of said oscillator, on the other pair of deflecting means of said oscilloscope, the coordinated horizontal and vertical deflections in said cathode ray tube tracing a transmission characteristic of said cavity resonator similar to the calibration of said cavity resonator for said range of frequencies, said first deflecting means being controlled by the unknown frequency for varying the deflection of said cathode ray beam at the unknown frequency trace from the deflection produced by the sweeping oscillator at the signal frequency.

11. In a wave meter system for measuring the frequency of a signal, a resonant cavity of fixed geometric construction giving it a predetermined transmission characteristic for each frequency of a range of frequencies of electric wave energy, oscillator means for generating a constant amplitude signal of continuously varying frequency covering a portion of the range of frequencies to be measured by said wave meter, means for impressing said signals on said resonant cavity, a cathode ray tube oscilloscope having deflecting means; means for impressing on one set of deflecting means of said cathode ray tube oscilloscope signals varying in amplitude in accordance with the transmission characteristics of said resonant cavity for each frequency impressed thereon; and means for impressing signals on the other set of deflecting means of said cathode ray tube, varying in amplitude in accordance with the variation in frequency of the signal generated by said oscillator.

12. In a wave meter system for measuring the frequency of a signal; a resonant cavity having permanent transmission characteristics; a sweeping oscillator generating signals of continuously varying frequency over a frequency range of electric wave energy; means including circuit connections for impressing said signals from said sweeping oscillator on said resonant cavity; an oscilloscope; means for indicating on said oscilloscope the variable transmission characteristics of said resonant cavity for said oscillator range of frequencies; means for producing a beat note of said oscillator frequency and the signal frequency being measured as said oscillator frequency approaches the frequency of said signal frequency and means for impressing said beat note on said oscilloscope in correlated position with respect to the frequency thereof.

13. In a wave meter for measuring the frequency of a signal, a cavity of fixed geometric construction giving it a predetermined transmission characteristic for each frequency transmitted therethrough, means for impressing a range of frequencies of electric wave energy and of constant amplitude on said cavity; means for measuring the transmission losses of said cavity for each impressed frequency; and means controlled by the signal for changing the transmission loss measurement of said cavity for said impressed electric wave energy at the frequency of said signal.

14. Apparatus for measuring the frequency of ultra high frequency electric wave energy, comprising a cavity resonator constructed and arranged to have a multiplicity of resonant frequencies occurring at determinable frequencies throughout a relatively wide range of ultra-high frequencies, a source of ultra high frequency electric wave oscillations, means for cyclically sweeping the frequency of said oscillations over at least a portion of said range, means for applying said oscillations to said cavity resonator, means for deriving from said cavity resonator a portion of said applied oscillations, the amplitude of said derived oscillations being a function of the transmission characteristics of said cavity resonator, means for rectifying said derived oscillations, a second source of ultra high frequency wave energy of unknown frequency, means including a non-linear circuit element for combining wave energy from both of said sources, means for deriving a low frequency beat signal from said non-linear circuit element, and means responsive to said rectified derived oscillations and to said derived low frequency beat signal for indicating the frequency of the wave energy from said second source in terms of the transmission characteristics of said cavity resonator.

15. A wave meter comprising a fixed resonant cavity resonant at a plurality of frequencies in a frequency band, a high-frequency coupling unit connected at one end of said sealed resonant cavity, and an output coupling unit at the other end thereof, the transmission characteristics of the resonant cavity being individual to each resonant frequency, from which a calibration curve consisting of a representation of the relative transmission response for frequencies in the desired frequency band is graphically shown, means including a source of continuously varying frequency in the desired frequency range of the meter operation for energizing said input coupling unit, a cathode ray oscilloscope including circuit connections from said source to said oscilloscope and from the output coupling unit to said oscilloscope for tracing out on the screen of said oscilloscope a transmission characteristic of the cavity corresponding to the calibrated transmission characteristic curve, whereby it is possible to compare the trace of the cathode ray oscilloscope and the established calibration curve of the resonant cavity and thus identify the frequency of the several resonant frequencies as indicated on the fluorescent screen, and means for applying a signal of unknown frequency to said oscilloscope so that it appears superimposed upon the trace caused by the same frequency from said variable source, said means comprising circuit connections for beating the unknown and variable frequency, a detector circuit responsive to said beat signal, and means for impressing said detector signal on said oscilloscope.

16. A wave meter comprising a cavity of fixed geometric construction which is resonant at a plurality of distributed frequencies throughout a frequency band, the output amplitude at each resonant point for an input signal being individual to each frequency and producing a plurality of reference frequencies, said cavity having an input coupling unit and an output coupling unit, means including a source of continuously varying frequency in the frequency range of the meter operation for energizing said input coupling unit, a detector connected to the output coupling unit, a cathode ray oscilloscope having a screen, a source of cathode rays and deflecting means, means including circuit connections from said detector to one set of deflecting means of said cathode ray oscilloscope, and means including circuit connections from said source of varying frequency to another of said sets of deflecting means.

17. In a measuring device for measuring the frequency of electric wave energy, a transmission medium simultaneously resonant at a multiplicity of spaced frequencies throughout a frequency range, means for impressing signals in said range of frequencies on said transmission medium, a visual indicator connected in the output of said transmission medium, having a predetermined response to the output signals of said transmission medium, and means for modifying the effect on said indicator of the signal at the frequency being measured.

WILLIAM E. BRADLEY.

REFERENCES CITED

The following references are of record in the file of this patent:

UNITED STATES PATENTS

| Number | Name | Date |
|---|---|---|
| 2,269,126 | Pieracci | Jan. 6, 1942 |
| 2,272,768 | Crosby | Feb. 10, 1942 |
| 2,321,315 | Peterson et al. | June 8, 1943 |
| 2,381,940 | Wallace | Aug. 14, 1945 |
| 2,387,685 | Sanders | Oct. 23, 1945 |

OTHER REFERENCES

Electronics, page 76, November 1939.

Brainerd et al.: "Ultra High Frequency Techniques," published July 1942, D. Van Nostrand Company Inc., pages 480–486.

Popkin-Clurman: "Panoramic Radio Reception," pages 15–18 and 46–49, Radio, March 1942.